(12) United States Patent
Ragan

(10) Patent No.: US 11,565,893 B2
(45) Date of Patent: Jan. 31, 2023

(54) ICE-COVERED TRAY CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 142 days.

(21) Appl. No.: 17/266,323

(22) PCT Filed: Aug. 15, 2019

(86) PCT No.: PCT/US2019/046640
§ 371 (c)(1),
(2) Date: Feb. 5, 2021

(87) PCT Pub. No.: WO2020/046591
PCT Pub. Date: Mar. 5, 2020

(65) Prior Publication Data
US 2021/0316952 A1    Oct. 14, 2021

Related U.S. Application Data

(60) Provisional application No. 62/724,418, filed on Aug. 29, 2018.

(51) Int. Cl.
B65G 54/02 (2006.01)
B65G 37/02 (2006.01)
B65G 45/10 (2006.01)
B65G 47/53 (2006.01)

(52) U.S. Cl.
CPC ............ B65G 54/02 (2013.01); B65G 37/02 (2013.01); B65G 45/10 (2013.01); B65G 47/53 (2013.01); B65G 2201/0202 (2013.01); B65G 2203/041 (2013.01)

(58) Field of Classification Search
None
See application file for complete search history.

(56) References Cited

U.S. PATENT DOCUMENTS 2,774,360 A * 12/1956 Hughes ............... F25C 1/24
                                              134/156
2,974,497 A    3/1961 Carpenter et al.
3,695,346 A   10/1972 Nichols
4,189,928 A    2/1980 Cerny
5,256,434 A * 10/1993 Conway ............ A23B 4/062
                                              426/396

(Continued)

FOREIGN PATENT DOCUMENTS

CN      203255696 U    10/2013
DE      3008742 A1     10/1981

(Continued)

OTHER PUBLICATIONS

Extended European Search Report, European Patent Application No. 19853696.3, dated Apr. 8, 2022, European Patent Office, Munich Germany.

Primary Examiner — Kavel Singh
(74) Attorney, Agent, or Firm — James T. Cronvich

(57) ABSTRACT

A tray conveyor comprising ice-coated magnetic trays driven by a linear-motor stator along a rail track. The ice coating is applied to the trays to provide a product-bearing ice surface. After the product is processed and transferred off the tray, the top layer of the contaminated ice coating is removed and the tray with the remaining ice coating reused.

25 Claims, 8 Drawing Sheets

(56) References Cited

U.S. PATENT DOCUMENTS

| | | | |
|---|---|---|---|
| 5,879,732 A * | 3/1999 | Caracciolo, Jr. | C02F 9/00 |
| | | | 426/81 |
| 10,199,967 B2 * | 2/2019 | Yamamoto | G05B 1/01 |
| 10,654,660 B2 * | 5/2020 | Ragan | B65G 45/10 |
| 11,230,776 B2 * | 1/2022 | Mills | H01L 31/0725 |
| 2004/0040476 A1 | 3/2004 | Diers | |
| 2006/0240162 A1 | 10/2006 | Caselli et al. | |
| 2011/0291496 A1 | 12/2011 | Bobelis et al. | |
| 2016/0325938 A1 | 11/2016 | King et al. | |
| 2017/0247201 A1 | 8/2017 | Prussmeier | |
| 2018/0186574 A1 | 7/2018 | Teilmann | |

FOREIGN PATENT DOCUMENTS

| | | |
|---|---|---|
| DE | 19824869 A1 | 12/1999 |
| EP | 2412649 A1 | 2/2012 |
| FR | 2521535 A1 | 8/1983 |
| JP | 2006-081412 A | 3/2006 |
| WO | 2010092473 A1 | 8/2010 |
| WO | 2018067567 A1 | 4/2018 |

* cited by examiner

ICE-COVERED TRAY CONVEYOR

BACKGROUND

The invention relates generally to power-driven conveyors and in particular to ice-covered tray conveyors.

Current methods of processing meat, fish, or poultry require cutting bulk product by hand. For example, the bulk meat is conveyed to an operator who loads the meat onto a tray. The operator then cuts the meat into defined portions on the tray's cutting surface. The tools used to cut the meat can score and scratch the cutting surface. Trays marred by scratched surfaces are difficult to sanitize—especially if the trays are sanitized manually. Biofilms, which are especially difficult to remove, can form on and contaminate the trays.

SUMMARY

A tray conveyor embodying features of the invention comprises a track having an array of electromagnetic drive coils extending along the length of the track and a coil driver driving the drive coils to produce an electromagnetic flux wave that travels along the length of the track along a conveying path defined by the drive coils. A tray conveying products through a process includes a top and a bottom. A permanent magnet array between the top and the bottom produces a magnetic field that interacts with the traveling electromagnetic flux wave to produce a force that propels the tray along the track. An ice coating covers at least the top of the tray. Products sit atop the ice coating on the top when the products are undergoing the process.

In another aspect, a method for conveying products through processing comprises: (a) advancing a magnetic tray along a track with a linear motor drive; (b) adding an ice coating to cover the top of the tray; (c) loading a product onto the ice coating atop the tray; (d) processing the product; (e) removing the product from the tray during or after undergoing the process; (f) removing at least a top layer of ice from the ice coating covering the top of the tray; and (g) repeating steps (c) through (f).

DETAILED DESCRIPTION

Figure 1:
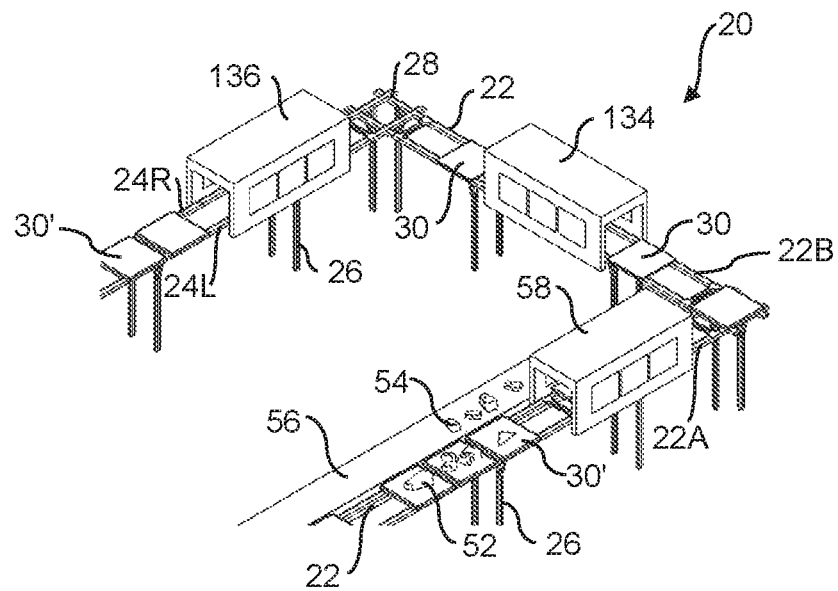
FIG. 1 is an isometric view of a portion of a tray conveyor embodying features of the invention.
Figure 2:
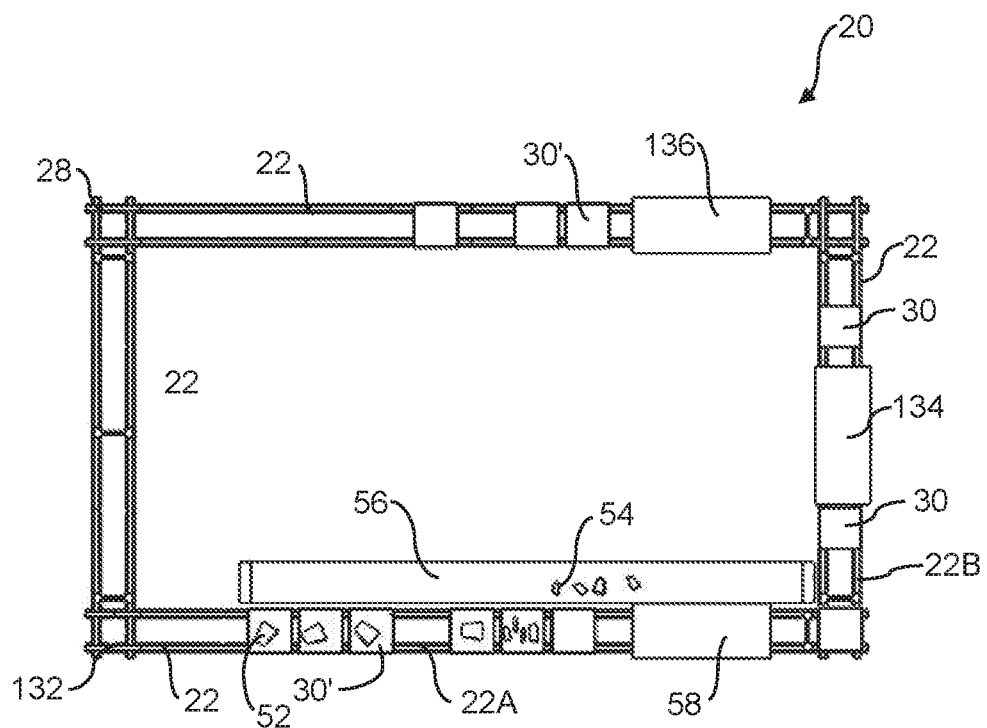
FIG. 2 is a top plan view of the tray conveyor of FIG. 1.

FIGS. 1 and 2 show one version of a tray conveyor embodying features of the invention. The tray conveyor 20 has a track 22 that defines a conveying path. In this example, the track 22 has a pair of parallel rails 24L, 24R supported by legs 26 along the length of the track. In right-angle corner sections 28 of the track 22, the track rails 24L, 24R cross each other at a 90° angle. The corners could alternatively be made of curved track sections without crossing track rails.

Figure 3:
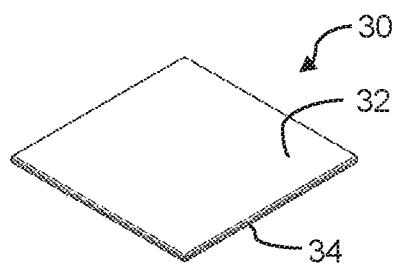
FIG. 3 is an isometric view of a tray for the conveyor of FIG. 1.

Magnetic trays 30 are independently propelled along the track 22 by linear stator coils in the track rails 24L, 24R. The trays 30, shown in more detail in FIGS. 3 and 4, have a top 32 and an opposite bottom 34 sandwiching a permanent magnet layout 36. An electrically conductive aluminum or copper plate 38 is optionally sandwiched between the top 32 and the permanent magnet array 36. The top 32 and the bottom 34 may be made of a rigid, nonmagnetic, corrosion-resistant material. For example, stainless steel top and bottom covers can form the tray's top and bottom. The permanent magnet layout 36 shown in FIG. 4 has four magnet arrays 40A-40D, each extending along a different side of the rectangular tray 30. The magnet arrays 40A-40D can be arranged as Halbach arrays to focus the magnetic field toward the tray bottom 34. The top 32 of the tray 30 in FIG. 5 may be covered with a pre-made ice cover 42 with a recess 44 in which the tray fits.

Figure 6:
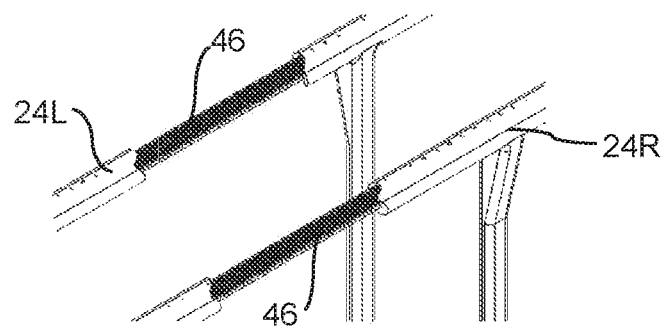
FIG. 6 is an isometric view of a portion of the track rails for a tray conveyor as in FIG. 1 with parts of the rails cut away.
Figure 7:
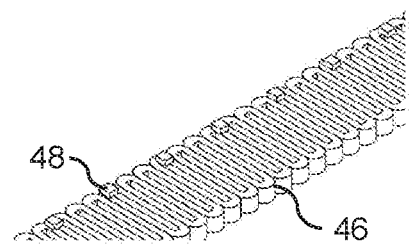
FIG. 7 is an enlarged isometric view of stator coils in the track rails of FIG. 6.

As shown in FIG. 6, the two track rails 24L, 24R each have linear stator coils 46 extending along the length of the track. The electromagnetic drive coils 46 shown enlarged in FIG. 7 are driven by a coil driver to produce an electromagnetic flux wave that travels along the length of the track rails 24L, 24R. The traveling flux wave interacts with the magnetic field of the permanent magnet arrays in the trays to produce a force propelling the trays along the track. Position sensors 48, such as Hall-effect sensors, are periodically spaced along the length of the linear stator coils 46 at predetermined sensor positions to detect the presence of a tray at the sensor positions. The position sensors 48 are used by the coil driver to drive the coils with a commutated current as a brushless dc motor. As one alternative, the magnetic trays could be driven as a synchronous linear ac motor. The lateral spacing of the permanent magnet arrays along opposite sides of the trays matches the lateral spacing of the electromagnetic drive coils for effective magnetic coupling. If a single-rail track is used instead, the trays would need only a single permanent magnet array in line with the drive coils in the rail. The single rail can be a wide rail whose width is less than, equal to, or greater than the width of the tray and could have a single stator or a pair of stators.

Figure 4:
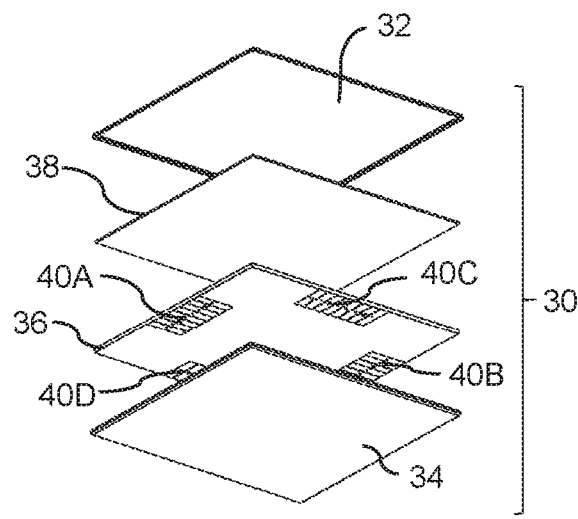
FIG. 4 is an exploded view of the tray of FIG. 3.
Figure 8:
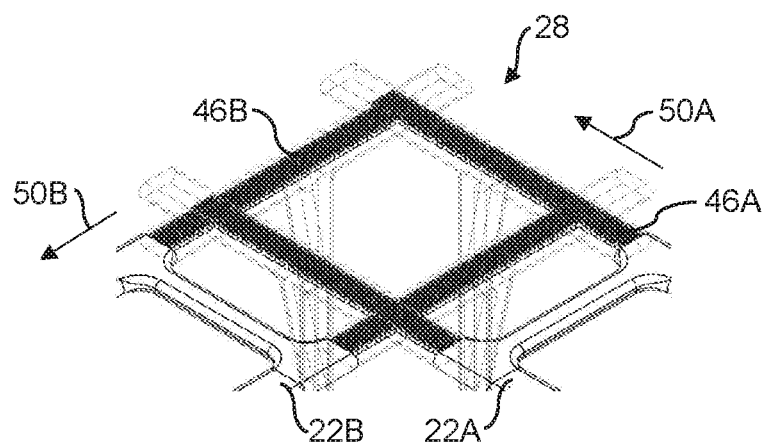
FIG. 8 is an isometric view of a right-angle corner section of the track coils for a tray conveyor as in FIG. 1 with the corner rails in phantom.
Figure 9:
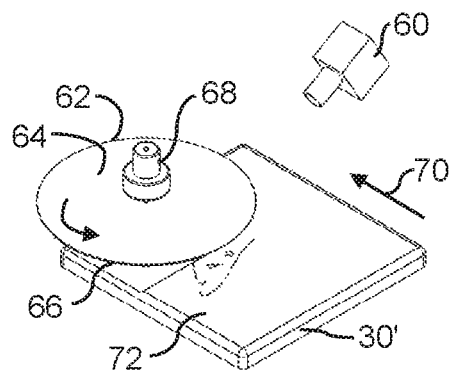
FIG. 9 is an isometric view of a rotating-blade ice refinisher removing a top layer of an ice coating from a tray as in FIG. 3.

FIG. 8 shows a corner section 28 of the conveyor in greater detail. The drive coils 46A in a first track segment 22A produce an electromagnetic flux wave traveling in a first conveying direction 50A. The drive coils 46B in a second track segment 22B perpendicular to and intersecting the first track segment 22A propagate an electromagnetic wave in a second direction 50B 90° from the first direction 50A. When a tray as in FIG. 4 is completely on the corner section, its two pairs of permanent magnet arrays are aligned under the pairs of intersecting rails on each track segment 22A, 22B. The drive coils 46A on the first track segment 22A are then de-energized, and the drive coils 46B on the second track segment 22B are energized to propel the tray in the new direction 50B.

As shown in FIGS. 1 and 2, trays 30' with ice coatings covering at least their tops advance along a first track segment 22A with products 52 sitting on the ice coatings. The ice-coated trays 30' proceed along the track segment 22A to a processing area where the products 52 are processed manually or robotically. Processed products 54 are transferred to a discharge conveyor 56. Residual contaminants from the products reside on the ice coatings, which isolate the trays themselves from contamination. The tracks themselves could be coated in ice and periodically defrosted for improved hygiene. An ice refinisher or a defroster 58 on the conveying path removes a top layer or the entirety of the ice coatings along with the contaminants they hold.

FIGS. 9-13 show various versions of ice refinishers acting on ice-coated trays 30'. All the refinishers are shown with cameras 60 associated with vision systems to control the thickness of the top layer of ice removed from the ice coating. But the refinishers could operate without cameras and a vision system and remove a fixed amount or all of the ice coating. The ice refinisher 62 of FIG. 9 includes a trimming wheel 64 with a peripheral blade 66. The wheel 64 is rotated by a motor 68 as the wheel moves side to side along the tray 30' as it is driven in the conveying direction 70 by the drive coils in the track rails. The rotating and side-to-side oscillating wheel 64 cuts into the ice coating 72 covering the top of the tray 30' to trim a top layer of ice.

Figure 10:
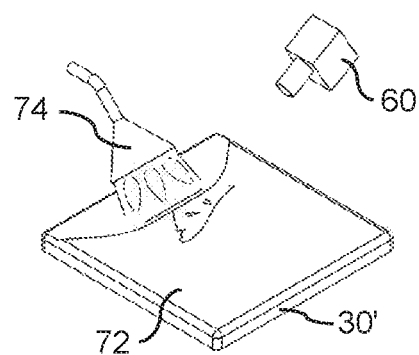
FIG. 10 is an isometric view of a flame or hot-air ice refinisher removing a top layer of an ice coating from a tray as in FIG. 3.
Figure 11:
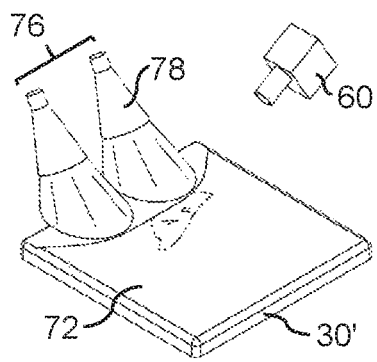
FIG. 11 is an isometric view of an infrared ice refinisher removing a top layer of an ice coating from a tray as in FIG. 3.
Figure 12:
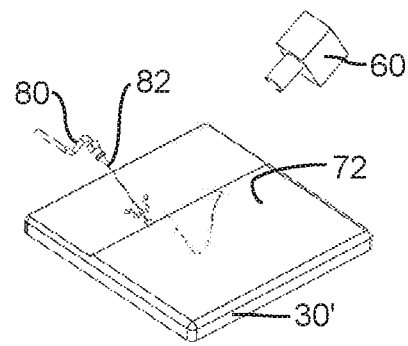
FIG. 12 is an isometric view of an air- or water-jet ice refinisher removing a top layer of an ice coating from a tray as in FIG. 3.
Figure 13:
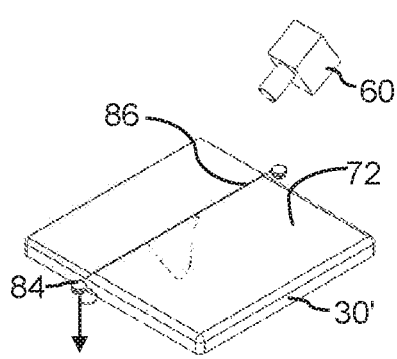
FIG. 13 is an isometric view of a resistance-wire ice refinisher removing a top layer of an ice coating from a tray as in FIG. 3.
Figure 14:
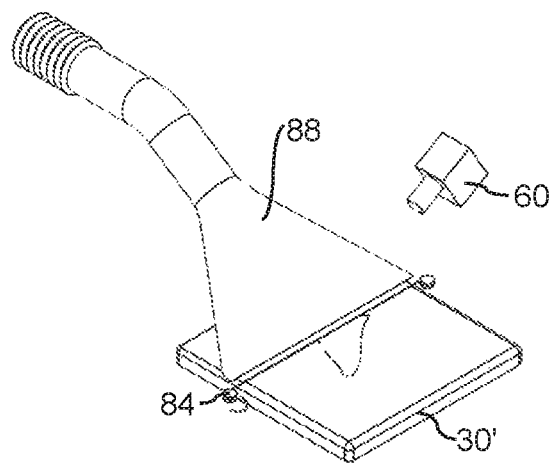
FIG. 14 is an isometric view of a vacuum system removing melted ice in conjunction with an ice refinisher as in FIG. 13.

The ice refinisher 74 of FIG. 10 is a heater that emits a flame or hot air at the top of the advancing tray 30' to melt a top layer of the ice coating 72. The ice refinisher 76 of FIG. 11 uses infrared lamps 78 directed at the ice coating 72 to melt a top layer. The ice refinisher 80 of FIG. 12 uses a fluid jet 82 of compressed air or water moving side to side across the tray 30' to remove a top layer of the ice coating 72. And the ice refinisher 84 of FIG. 13 heats up a resistance wire 86 extending across the width of the tray 30' and movable in depth to melt a top layer of the ice coating 72. FIG. 14 shows the ice refinisher 84 of FIG. 14 with a vacuum system 88 to remove melted ice and ice particles from the residual ice coating. The vacuum system 88 can be used with any of the ice refinishers. Once an ice refinisher has removed the contaminated top layer, the tray with the residual uncontaminated ice coating can be removed from the track and replaced back on the track upstream to convey another product through the process.

Figure 15A:
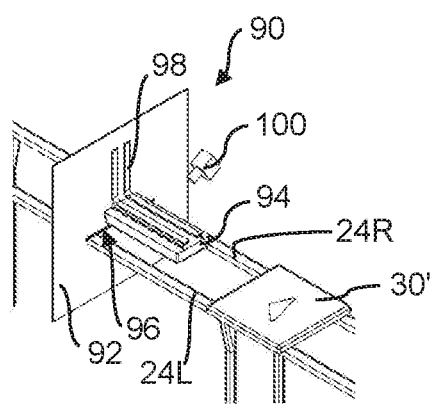
FIGS. 15A-15D are isometric views showing the sequence of defrosting a tray as in FIG. 3 with inductive heating.
Figure 15B:
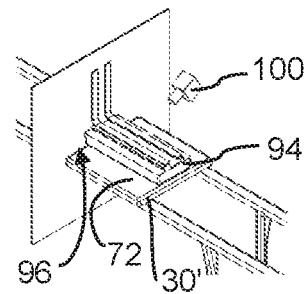
Figure 15C:
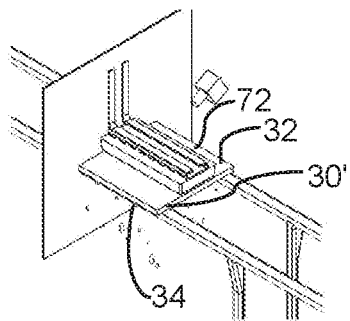
Figure 15D:
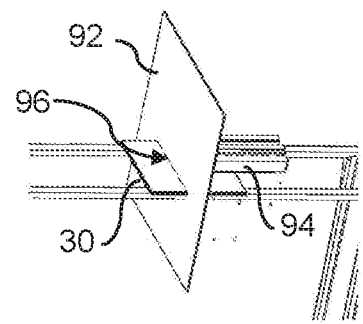

Instead of removing only a top layer of the ice coating as the ice refinisher can, a defroster can remove the entire ice coating. One example of a defroster is shown removing the ice coating in FIGS. 15A-15D. The defroster 90 includes a barrier 92 that extends across the conveying path and a linear-induction motor stator 94 above the rails 24L, 24R. A slot 96 in the barrier 92 extends upward from the rails a height slightly greater than the thickness of the magnetic tray 30. Brackets 98 are attached between the barrier 92 and the stator 94 to support it above the rails 24L, 24R. A camera 100 and its associated vision system images the tray 30 under the stator 94 as in FIG. 15B. The energized rails 24L, 24R push the tray 30 against the stop 92. The thickness of the ice coating 72 on the tray prevents the tray from passing through the slot 96. The linear-induction motor stator coils 94 are energized to produce an electromagnetic field that induces eddy currents in the electrically conductive copper or aluminum plate (38, FIG. 4). The eddy currents heat the plate, and that heat is conducted to the top 32 and the bottom 34 tray covers 32, 34 as shown in FIG. 15C. The inductive heating melts the ice coating 72 from the inside out and defrosts the tray 30. When the ice coating 72 is melted, the tray 30 can pass through the slot 96 as shown in FIG. 15D. The camera 100 and the visioning system can be used to de-energize the defroster's stator 94 when they detect no tray 30 in position against the stop 92.

Figure 16A:
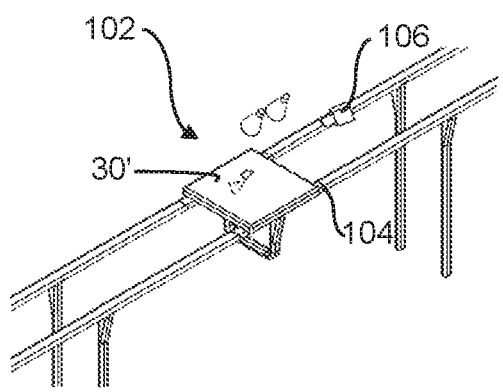
FIGS. 16A and 16B are isometric views of an infrared defroster and tilter removing an ice coating from a tray as in FIG. 3.
Figure 16B:
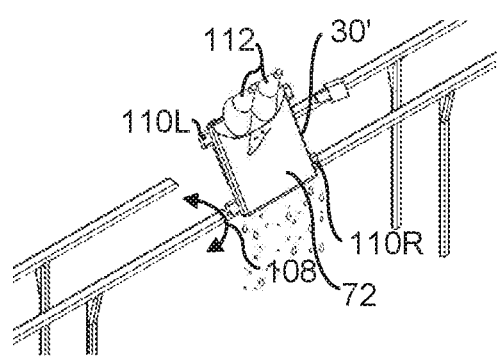

An infrared defroster 102 is shown in FIGS. 16A and 16B. When the ice-coated tray 30' reaches a tiltable track segment, a camera 106 and its associated vision system or another kind of position sensor detects the tray, and a tilt actuator (not shown) tilts the tray as indicated by the arrow 108 in FIG. 16B. When the tiltable track segment 104 is tilted, its stator coils are disconnected from the rail coil drivers and connected to direct-current coil drivers that generate an electromagnetic field to which the permanent magnet arrays in the tray 30 are attracted. The force of attraction prevents the tray 30 from sliding off the rails. Infrared lamps 112 direct their radiation at the ice coating 72 on the tilted tray 30. As the ice coating melts, the water is shed from the tilted tray 30 by gravity. The camera 100 and its vision system are used to determine when the tray 30 is completely defrosted so that the tilt actuator can pivot the tiltable track segment 104 back to its untilted position. Once the track segment is back in the untilted position, the defrosted tray 30 can resume its advance along the conveying path.

Figure 17A:
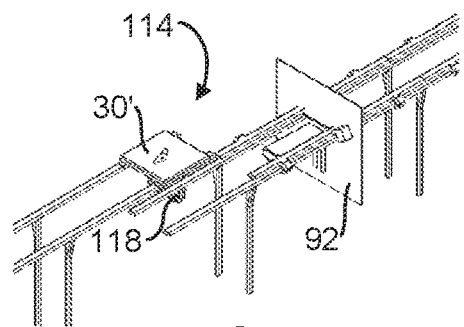
FIGS. 17A-17D are isometric views showing the sequence of inductively defrosting an upside-down tray as in FIG. 3.
Figure 17B:
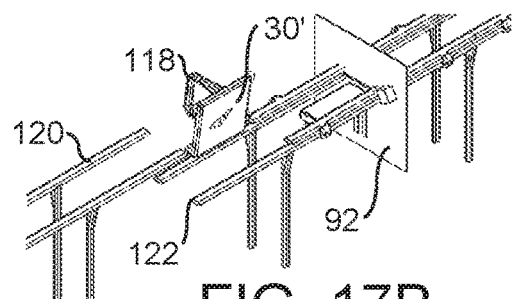
Figure 17C:
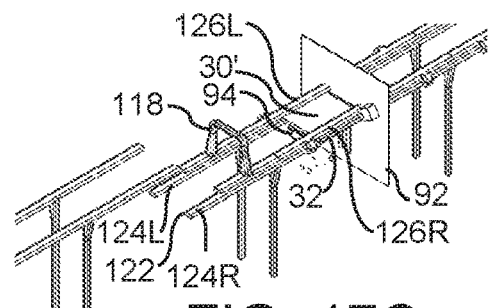
Figure 17D:
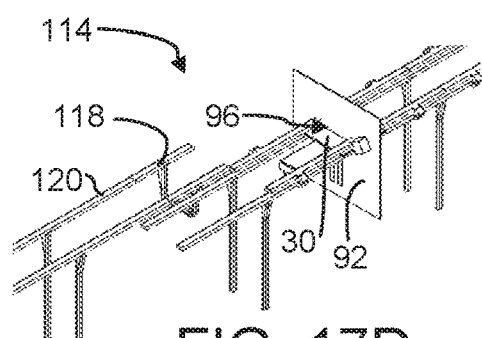

Another defroster is shown in FIGS. 17A-17D. The defroster 114 is similar to that of FIGS. 15A-15D. One difference is that the barrier 92 and the defrosting stator 94 are "upside down," i.e., rotated 180° about the conveying direction from their positions in FIGS. 15A-15D. A tray-flipping track segment 118, such as an extended-range tiltable track segment as in FIGS. 16A and 16B, flips the ice-coated tray 30' 180° while transferring it from a first track segment 120 to an adjacent laterally offset second track segment 122 as shown in FIG. 17B. The upside-down, ice-coated tray 30' is blocked by the barrier 92 as shown in FIG. 17C. The second track segment 122 has a pair of lower passive guide rails 124L, 124R without stators. The lower rails 124L, 124R prevent the upside-down tray 30' from falling. Upper guide rails 126L, 126R include the rail stators that push the tray 30' against the barrier 92. The defrosting stator 94 beneath the second track segment 122 inductively heats the electrically conductive plate in the tray 30' to melt the ice coating. The melted ice falls from the tray without contaminating the downward-facing tray top 32. As shown in FIG. 17D, once the ice coating is removed, the defrosted tray 30 passes through the slot 96 in the barrier 92, and the flipping track segment 118 is pivoted back to its position in line with the first track segment 120. A similar flipping track segment downstream of the defroster 114 rights the tray 30 with its top facing upward to continue along the conveying path.

Figure 5:
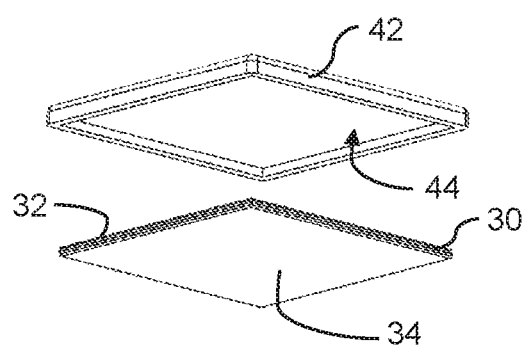
FIG. 5 is an exploded view of a tray as in FIG. 3 with a pre-made ice cover.
Figure 18A:
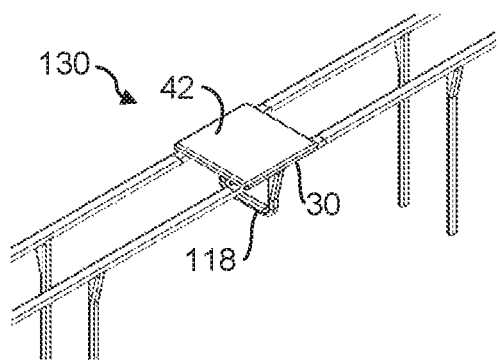
FIGS. 18A-18C are isometric views showing the sequence of flipping a tray as in FIG. 5 to remove the ice cover.
Figure 18B:
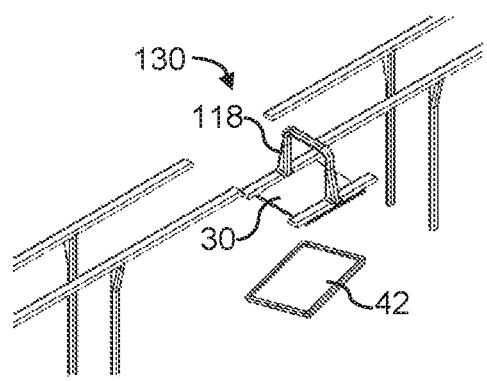
Figure 18C:
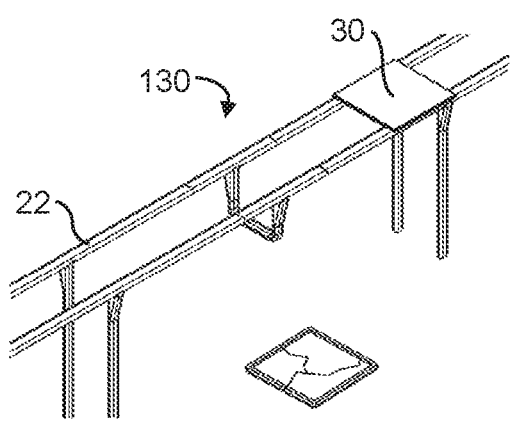

If the tray 30 is covered with a conforming pre-made ice cover 42 as in FIG. 5, a defroster can be replaced by an ice-cover remover 130 as shown in FIGS. 18A-18C. A flipping track segment 118, like the one in FIGS. 17A-17D flips the tray 30 with its ice cover 42 upside down as shown in FIG. 18B. The ice cover 42 falls from the tray 30. Once the ice cover 42 has been removed, the flipping track segment 118 returns to its position in line with the main track 22, and the ice-free tray 30 advances along the track in the conveying direction.

Defrosted trays 30 exiting the defroster 58 in FIGS. 1 and 2 are diverted from the main track 22A to a tray sanitizer 134 in a side track 22B. The sanitizer 134 sanitizes the ice-free trays 30, which are then advanced along the side track 22B to a tray freezer 136, which freezes an ice-coating around the tray 30 or installs an ice cover on top of the tray. The ice-coated tray 30' is driven back to the entrance end 132 of the main track 22A to receive product.

Figure 19:
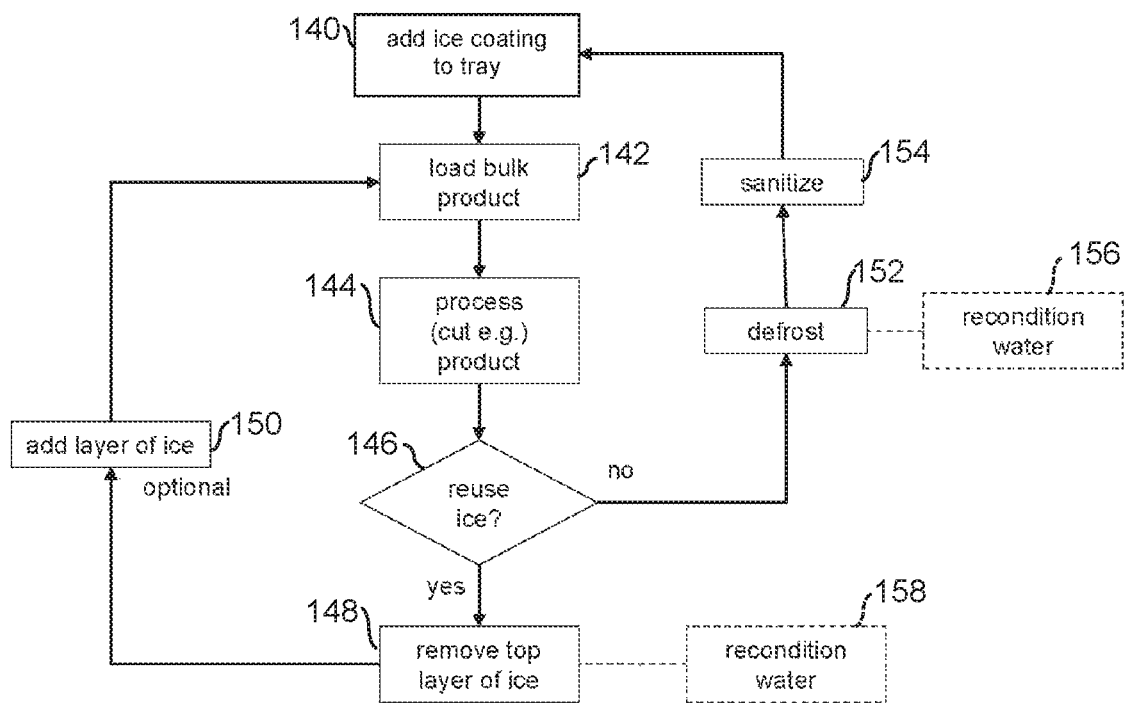
FIG. 19 is a flowchart describing one example of a method for using ice-covered trays in a conveyor system as in FIG. 1.

A flowchart of one way the tray conveyor can be operated is shown in FIG. 19. First, at step 140, an ice coating or an ice cover is added to the tray, which is then loaded with a bulk product, such as a slab of meat, at step 142. In step 144, the product is then processed, e.g., cut and removed from the tray, whose ice coating is now contaminated by the product. If enough ice remains atop the tray to be reused as determined by visioning the tray at step 146, the top layer of the ice coating is removed at step 148 and a further layer of ice is optionally added (step 150) before the tray is returned to receive bulk product. If it is determined that the ice coating is too contaminated or too thin to be reused, the tray is defrosted and the ice totally removed at step 152. The defrosted tray is sanitized at step 154 before returning to the freezer to have an ice coating added at step 140. As an option, the contaminated ice removed from the tray by the defroster or the ice refinisher can be reconditioned and reused as in steps 156 and 158.

Figure 20:
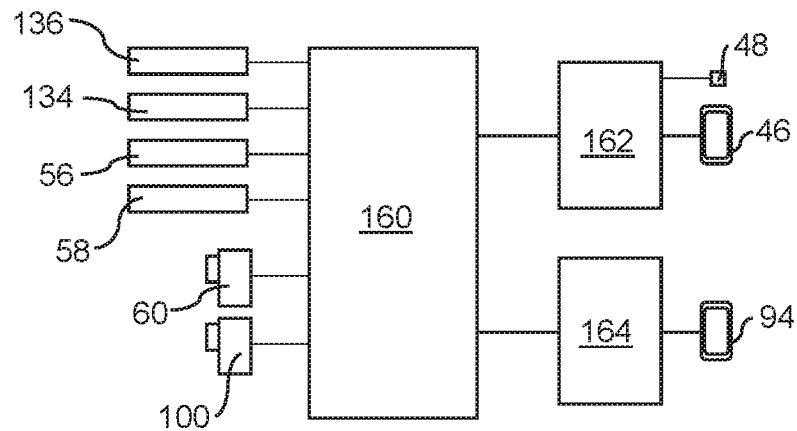
FIG. 20 is a block diagram of a control system for the tray conveyor of FIG. 1.

A block diagram of an exemplary control system for the tray conveyor of FIGS. 1 and 2 is shown in FIG. 20. A controller 160, such as a programmable logic controller or a special or general purpose computer, which may be an individual system controller or may represent a number of distributed controllers throughout the tray conveyor, executes program instructions stored in program memory to control the operation of the tray conveyor. The controller 160 enables and disables the coil drivers 162 driving the drive coils 46 in the various track segments. The coil drivers 162 use feedback from the Hall-effect sensors 48 to electronically commutate the coil drive currents. The controller also controls the heating stator coils 94 in the defroster with a dedicated defroster coil driver 164. The controller 160 also represents the visioning system that takes the digital images from the cameras 60, 100 in the ice refinisher or defrosters 58 to control their rail actuators, direct-current coil drivers, and ice removal elements. The controller 160 also controls the operation of the sanitizer 134 and the freezer 136, as well as the discharge conveyor 56.

What is claimed is:
1. A tray conveyor comprising:
   a track having an array of electromagnetic drive coils extending along the length of the track and defining a conveying path;
   a coil driver driving the drive coils to produce an electromagnetic flux wave that travels along the length of the track;
   a tray conveying products through a process, the tray including:
      a top;
      a bottom;
      a permanent magnet array between the top and the bottom producing a magnetic field that interacts with the traveling electromagnetic flux wave to produce a force that propels the tray along the track;
      an ice coating covering at least the top of the tray, wherein products sit atop the ice coating on the top when the products are undergoing the process;
   an ice refinisher on the conveying path wherein the ice refinisher removes a top layer of ice from the ice coating covering the top of the tray.

2. A tray conveyor as claimed in claim 1 wherein the permanent magnet array is a Halbach array.

3. A tray conveyor as claimed in claim 1 wherein the tray includes a stainless steel top cover forming the top and a stainless steel bottom cover forming the bottom.

4. A tray conveyor as claimed in claim 1 wherein the track is covered with an ice coating contacting the tray.

5. A tray conveyor as claimed in claim 1 wherein the ice refinisher includes a visioning system producing images of the ice coating covering the top of the tray to control the thickness of the top layer of ice removed from the ice coating.

6. A tray conveyor as claimed in claim 1 wherein the ice refinisher comprises a rotating blade that trims the top layer of ice from the ice coating.

7. A tray conveyor as claimed in claim 1 wherein the ice refinisher comprises a heater using a flame or heated air to melt the top layer of ice from the ice coating.

8. A tray conveyor as claimed in claim 1 wherein the ice refinisher includes an infrared lamp to melt the top layer of ice from the ice coating.

9. A tray conveyor as claimed in claim 1 wherein the ice refinisher includes a fluid jet to cut the top layer of ice from the ice coating.

10. A tray conveyor as claimed in claim 1 wherein the ice refinisher includes a resistance wire as a heating element extending across the conveying path to melt the top layer of ice from the ice coating.

11. A tray conveyor as claimed in claim 1 wherein the ice refinisher melts the top layer of ice and includes a vacuum system to remove the water resulting from the melted top layer.

12. A tray conveyor as claimed in claim 1 comprising a tray defroster on the conveying path to remove the entire ice coating from the tray.

13. A tray conveyor as claimed in claim 1 wherein the coil driver drives the drive coils to produce an uncommutated direct-current electromagnetic field to attract the permanent magnet array and hold the tray to the track.

14. A tray conveyor as claimed in claim 1 comprising a tray freezer on the conveying path wherein the tray freezer adds the ice coating to the tray.

15. A tray conveyor as claimed in claim 1 wherein the track comprises a pair of parallel rails each including an array of the electromagnetic drive coils and wherein the tray has a pair of parallel permanent magnet arrays aligned with the arrays of electromagnetic drive coils in the rails.

16. A tray conveyor as claimed in claim 1 wherein the array of electromagnetic drive coils and the permanent magnet array form a brushless dc motor.

17. A tray conveyor as claimed in claim 1 comprising a freezer producing an ice cover and a cover applicator on the conveying path depositing the ice cover on the top of the tray to form the ice coating.

18. A tray conveyor comprising:
   a track having an array of electromagnetic drive coils extending along the length of the track and defining a conveying path;
   a coil driver driving the drive coils to produce an electromagnetic flux wave that travels along the length of the track;
   a tray conveying products through a process, the tray including:
      a top;
      a bottom;
      a permanent magnet array between the top and the bottom producing a magnetic field that interacts with the traveling electromagnetic flux wave to produce a force that propels the tray along the track;
      an ice coating covering at least the top of the tray, wherein products sit atop the ice coating on the top when the products are undergoing the process;
      an electrically conductive copper or aluminum plate;
   a tray defroster on the conveying path to remove the entire ice coating from the tray, the tray defroster including:
      a stop extending across the conveying path and having a slot sized to block a tray with the ice coating and to allow a tray with the ice coating removed to pass through;
      a linear-induction motor stator proximate the stop and producing a traveling electromagnetic flux wave inducing currents in the electrically conductive copper or aluminum plate that heat up the tray and melt the ice coating.

19. A tray conveyor as claimed in claim 18 wherein the linear-induction motor stator is below the track and wherein the track includes a rotatable portion that rotates the tray 180° about the conveying path so that the tray's top faces the linear-induction motor stator below the track.

20. A tray conveyor comprising:
   a track having an array of electromagnetic drive coils extending along the length of the track and defining a conveying path;
   a coil driver driving the drive coils to produce an electromagnetic flux wave that travels along the length of the track;
   a tray conveying products through a process, the tray including:
      a top;
      a bottom;
      a permanent magnet array between the top and the bottom producing a magnetic field that interacts with the traveling electromagnetic flux wave to produce a force that propels the tray along the track;
      an ice coating covering at least the top of the tray, wherein products sit atop the ice coating on the top when the products are undergoing the process;
   a tray defroster on the conveying path to remove the entire ice coating from the tray, the tray defroster including:
      a tilt actuator to tilt a tiltable portion of the track and the tray;
      a direct-current coil driver connected to the drive coils in the tiltable portion of the track to produce an electromagnetic field that attracts the permanent magnet array in the tray to prevent the tray from falling off the track.

21. A tray conveyor as claimed in claim 20 comprising an infrared lamp directing radiation at the tilted tray to defrost the tilted tray.

22. A method for conveying products through a process, the method comprising:
   (a) advancing a magnetic tray along a track with a linear motor drive;
   (b) adding an ice coating to the top of the tray;
   (c) loading a product onto the ice coating atop the tray;
   (d) processing the product;
   (e) removing the product from the tray during or after undergoing the process;
   (f) removing at least a top layer of ice from the ice coating covering the top of the tray;
   (g) adding a layer of ice to the top of the tray to replace the top layer of the ice coating removed;
   (h) repeating steps (c) through (g).

23. The method as claimed in claim 22 comprising removing the entire ice coating from the tray by defrosting and sanitizing the defrosted tray.

24. The method as claimed in claim 22 comprising adding an ice coating to the top of the tray by freezing an ice cover and putting it on top of the tray.

25. The method as claimed in claim 22 comprising tilting the tray to shed the top layer of ice removed from the tray.

* * * * *